(12) United States Patent
Iwata et al.

(10) Patent No.: US 6,989,653 B2
(45) Date of Patent: Jan. 24, 2006

(54) BATTERY POWER CIRCUIT AND AUTOMOBILE BATTERY POWER CIRCUIT

(75) Inventors: Akihiko Iwata, Tokyo (JP); Toshiyuki Kikunaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/434,281

(22) Filed: May 9, 2003

(65) Prior Publication Data

US 2004/0222771 A1    Nov. 11, 2004

(51) Int. Cl.
*H02J 7/00*    (2006.01)
*H02G 3/00*    (2006.01)

(52) U.S. Cl. ...................................... 320/134; 307/10.1
(58) Field of Classification Search ................. 320/134, 320/128, 132, 136; 307/10.1, 18, 29, 38, 307/43
See application file for complete search history.

(56) References Cited

U.S. PATENT DOCUMENTS 4,056,764 A * 11/1977 Endo et al. .................. 320/101

2003/0107352 A1 * 6/2003 Downer et al. ............... 322/40

FOREIGN PATENT DOCUMENTS

| JP | 3-56040 A | | 3/1991 |
| JP | 2001-136735 A | | 5/2001 |
| JP | 2001136735 A | * | 5/2001 |
| JP | 2002-10408 A | | 1/2002 |
| JP | 2002-218667 A | | 8/2002 |

OTHER PUBLICATIONS

Kachi et al.,US 09690183, Nov. 2, 1999, the whole document.*
"Engineering Circuit Analysis ", 39-Experimental Laws and Simple Circuits, McGraw-Hill, third edition, 1978.*
USPTO translation of elements in document JP-2001136735.*

* cited by examiner

*Primary Examiner*—Pia Tibbits
(74) *Attorney, Agent, or Firm*—Sughrue Mion, PLLC

(57) ABSTRACT

A load is connected to a first battery group. The first battery group and a second battery group are connected in series to each other. A bidirectional DC/DC converter for electric power migration between the first battery group and the second battery group is provided.

8 Claims, 12 Drawing Sheets

2-second battery group
3-DC/DC converter
4-load
5-power conversion circuit
6-electric motor
7-engine
8- second power transmitters

FIG. 1

2-second battery group
3-DC/DC converter
4-load
5-power conversion circuit
6-electric motor
7-engine
8- second power transmitters

FIG.2

2- second battery group
3- DC/DC converter
4- load
5- power conversion circuit
6- electric motor
7- engine
8- second power transmitters
9- key switch
10- cell motor
11- cell motor power transmitter

FIG. 4

3- DC/DC converter
4- load
5- power conversion circuit
6- electric motor
7- engine
8- second power transmitters
9- key switch
10- cell motor
11- cell motor power transmitter
20- capacitor group

FIG. 5A 2- second battery group
35-control circuit

FIG. 5B 353-amplifier
354-PWM modulator

FIG. 6

2- second battery group
4- load
36- control circuit

2- second battery group
30- bidirectional DC/DC converter

FIG. 15 PRIOR ART 4- load
5- power conversion circuit
6- electric motor
7- engine
8- second power transmitters
9- key switch
10- cell motor
11- cell motor power transmitter

BATTERY POWER CIRCUIT AND AUTOMOBILE BATTERY POWER CIRCUIT

BACKGROUND OF THE INVENTION

The present invention relates to a battery power circuit for use in a motorcar or the like, which circuit outputs a plurality of voltage levels.

Figure 15:
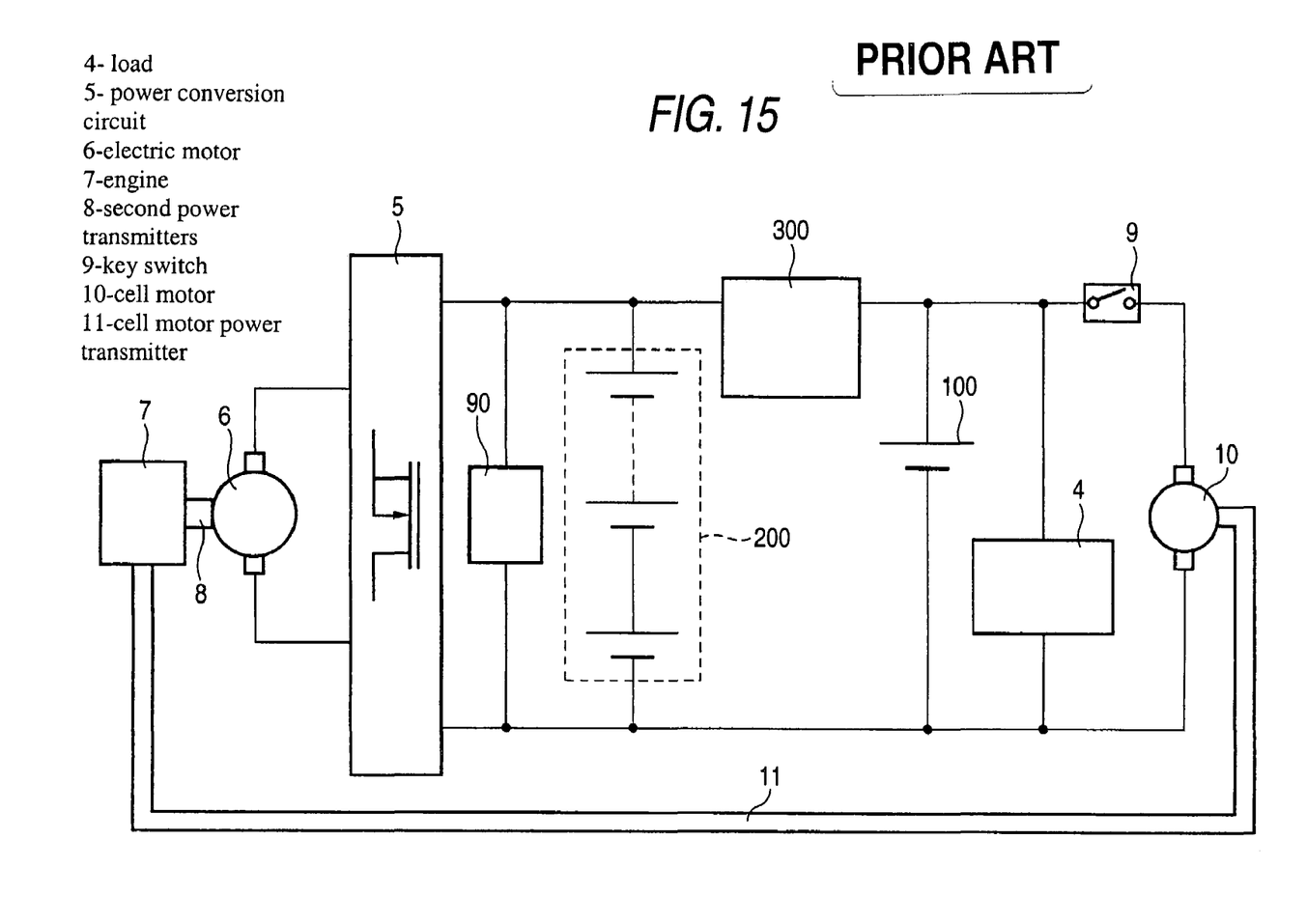
FIG. 15 is a diagram showing a related-art battery power circuit.

FIG. 15 shows a related-art automobile battery power circuit disclosed in TOYOTA Technical Review Vol. 50 No. 1 Jun. 2000 p.37 or the like. In FIG. 15, the reference numeral 7 represents an engine; 6, an electric motor for transmitting power to the engine through a first power transmitter 8; 5, a power conversion circuit for transmitting electric power to the electric motor 6; and 200, a battery group constituted by a plurality of batteries connected in series, connected to the power conversion circuit 5, and typically having a rated voltage of 36 V. The reference numeral 90 represents a load B connected to the battery group 200; 300, a DC/DC converter for stepping the voltage of the battery group down; 100, a battery charged by the DC/DC converter 300, and typically having a rated voltage of 12 V; and 4, a load A connected to the battery 100. Typically the load A is called a 14V load and the load B is called a 42V load. The reference numeral 9 represents a key switch for initial start-up; and 10, a cell motor for rotating at the time of initial start-up and transmitting power to the engine through a second power transmitter 11. Here, each of the first and second power transmitters 8 and 11 may include a power transmission unit for connecting the electric motor 6 and the engine 7 or the cell motor 10 and the engine 7 directly through a shaft, indirectly through a belt, or indirectly through gears.

First, the operation will be described with reference to FIG. 15. The power conversion circuit 5 converts the voltage of the battery group 200 into an alternating current or an intermittent direct current so as to rotate the electric motor 6 and start the engine 7. Generally, it is known broadly that useless fuel consumption during temporary stop (waiting at stoplights, a traffic jam, etc.) while driving a motorcar can be suppressed by stopping the engine 7 during the period of the temporary stop and starting the engine 7 again when the necessity of restarting arises (idle stop operation). At the time of this restart, however, power required for starting the engine 7 has to be supplied in a short time in order to restart the engine 7 smoothly by depressing an accelerator pedal or the like, and further to lead the motorcar to start its motion. To attain the supply of the required power, such a configuration is proposed that a voltage of 36 V is retained by the battery group 200, and a large current flows into the electric motor 6 through the power conversion circuit 5 so that high instantaneous power is transmitted to the electric motor 6. On the contrary, during the rotation of the engine 7 with fuel, the power of the engine 7 is transmitted to the electric motor 6 so that electricity is generated. Thus, the battery group 200 is charged to 36 V through the power conversion circuit 5.

However, most of electric components mounted on motorcars are formed of 14 V systems. Therefore, a battery whose rated voltage is 12V is required unless all the electric components are replaced by 42V systems. Not to say, in the present circumstances where there are few electric components supporting 42V systems and these electric components are expensive (due to the problem of quantity), it can be foreseen that electric components support 14V systems fundamentally, and hence it can be foreseen that the 14V load has a high capacity.

Therefore, a high-capacity stationary battery 100 is charged with a voltage of 12 V using the output of the battery group 200 through the DC/DC converter 300 so as to operate electric components. In addition, when electric components of 14V systems are used stationarily during driving or the like, the electric components have to be operated directly from the DC/DC converter 300. To this end, the DC/DC converter 300 has to have a high capacity.

Thus, even if a battery group having a rated voltage of 36 V is provided for attaining the idle stop operation, the power circuit will be expensive because the high-capacity DC/DC converter 300 or the high-capacity stationary battery 100 is required. Since the high-capacity DC/DC converter 300 generates a great deal of heat, accessories for cooling are required to thereby cause further increase in cost.

In addition, it is also generally known that greater power is required for starting the engine 7 at the time of initial start-up of the engine 7 (start-up in the state where the temperature of the engine 7 is low, for example, when driving is started initially). In order to use the electric motor 6 to perform initial start-up, it is necessary to supply a higher current to the electric motor 6. To this end, the power conversion circuit 5 has to have large-current specifications. Thus, the power conversion circuit 5 becomes expensive.

As a solution to this problem, there is proposed a system in which initial start-up is performed by the rotation of a cell motor based on key operation while only the idle stop operation is performed by an electric motor. By this system, the power conversion circuit does not have to have large-current specifications. However, at the time of initial start-up in such a configuration, it is necessary to supply a large quantity of charges to the cell motor. Thus, a high-capacity stationary battery is still essential. Therefore, even if electric components of 14V systems are reduced in the future, a high-capacity stationary battery still has to remain. This causes a great obstacle to reduction in cost.

In a related-art power circuit for an electric motorcar, a high-capacity DC/DC converter is required for obtaining 12 V from 36 V as described above. Accessories associated with the DC/DC converter are expensive, and the high-capacity 12V stationary battery 100 is also expensive and becomes an obstacle to miniaturization.

SUMMARY OF THE INVENTION

It is therefore an object of the invention to provide a battery power circuit in which a DC/DC converter or a battery is made low in capacity and small in size.

A battery power circuit according to the invention includes a first battery group connected to a load, a second battery group connected in series with the first battery group, and a DC/DC converter for electric power migration between the first battery group and the second battery group.

In addition, charging capacity of the first battery group may be different from charging capacity of the second battery group.

In addition, the first battery group may be constituted by one battery having a rated voltage of 12 V while the second battery group is constituted by two batteries having a rated voltage of 12 V and connected in series.

In addition, the DC/DC converter may include a series body of a switch and a reactor connected between one end of a series body of the first battery group and the second battery group and a connection point where the first battery group and the second battery group are connected in series, and a diode connected between a connection point of the switch and the reactor and the other end of the series body of the battery groups.

In addition, the DC/DC converter may be a bidirectional DC/DC converter for bidirectional electric power migration between the first battery group and the second battery group.

Further, the bidirectional DC/DC converter may include a series body of a first switch and a second switch connected to opposite ends of a series body of the first battery group and the second battery group, and a reactor connected between a connection point of the first battery group and the second battery group and a connection point of the first switch and the second switch.

In addition, a control unit may be provided for making control to prevent the first switch and the second switch from being turned on simultaneously.

In addition, the second battery group may be constituted by capacitors.

In addition, an automobile battery power circuit according to the invention includes an electric motor whose power is transmitted to an engine, and a power conversion circuit connected between a series body of a first battery group and a second battery group and the electric motor. The electric motor generates electricity in response to the power from the engine and charges the series body of the battery groups through the power conversion circuit.

Further, the electric motor may be an electric motor for restarting the engine which is stopped in accordance with temporary stop during driving.

In addition, a cell motor for starting the engine only by a key operation at an early stage of start of driving may be connected as the load.

In addition, electric power may be supplied from the first battery group to the second battery group through the bidirectional DC/DC converter while the engine is restarted by the electric motor.

In addition, electric power may be supplied from the series body of the first battery group and the second battery group to the electric motor through the power conversion circuit while the engine is started by the cell motor.

DETAILED DESCRIPTION OF THE PREFERRED EMBODIMENTS (Embodiment 1)

Figure 1:
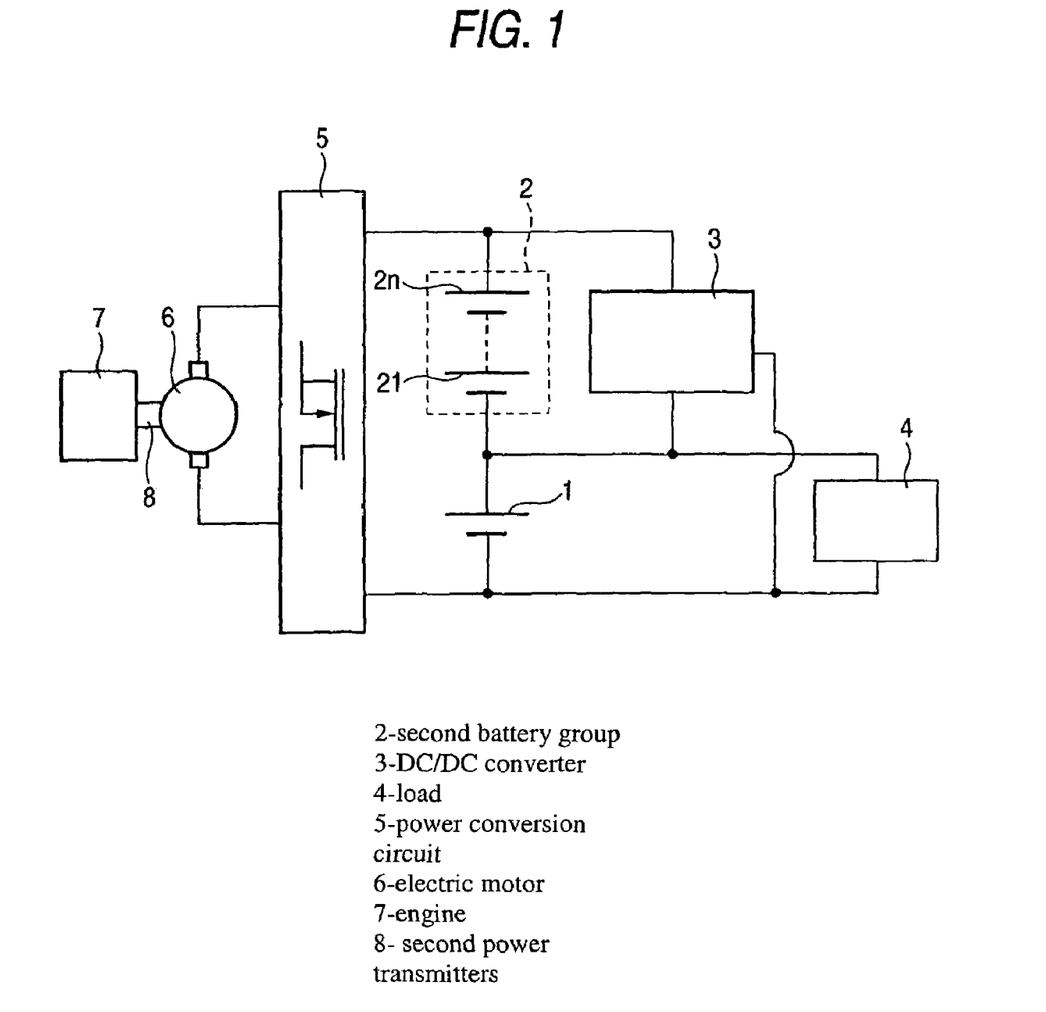
FIG. 1 is a diagram showing a battery power circuit according to Embodiment 1 of the invention.

FIG. 1 shows the configuration of an automobile battery power circuit according to Embodiment 1 of the invention. A battery group 1 (first battery group) and a battery group 2 (second battery group) are connected in series. The reference numeral 3 represents a DC/DC converter inserted between the battery group 1 and the battery group 2; 4, a load connected to the battery group 1; 5, a power conversion circuit connected to the opposite ends of the series body of the battery group 1 and the battery group 2; 6, an electric motor connected to the power conversion circuit 5; 7, an engine; and 8, a power transmitter for transmitting power between the electric motor 6 and the engine 7. Here, for example, the battery group 1 is constituted by one battery having a rated voltage of 12 V, and the battery group 2 is constituted by n batteries having a rated voltage of 12 V, that is, batteries 21 to 2n. The DC/DC converter 3 is connected among the opposite ends of the battery group 2 and the battery group 1 so as to step the voltage of the battery group 2 down to thereby supply electric power to the battery group 1. The battery group 1 is to supply electric power to electric components having a rated voltage of 12 V. The load 4 is connected to the opposite ends of the battery group 1.

During the stationary operation of the engine 7, the electric motor 6 rotates to also serve as a generator. Thus, the battery group 1 and the battery group 21–2n are charged in series by generated energy through the power conversion circuit 5. In addition, the voltage between the opposite ends of the battery group 1 and the battery group 21–2n is stepped down to 12 V and supplied to the load 4 through the DC/DC converter 3. In addition, electric power is also supplied from the battery group 1 to the load 4 directly in parallel. In addition, at the time of initial start-up or at the time of restart in the idle stop operation, the electric motor 6 is rotated directly from the series circuit of the battery group 1 and the battery group 21–2n through the electric conversion circuit 5, so that the engine 7 is started through the power transmitter 8.

In Embodiment 1 of the invention, the electric power supply to the load 4 is divided into two systems. That is, one is the system owing to the electric power directly charged into the battery group 1 through the power conversion circuit 5, and the other is the system owing to the electric power stepped down from the battery group 2 through the DC/DC converter 3. Here, the ratio of the electric power owing to the DC/DC converter 3 can be obtained easily from the following idea. That is, assume that the voltage of the battery group 1 and the voltage of the battery group 2 are balanced, that is, the charge quantity of charge into each battery group is equal to the charge quantity of discharge from the battery group.

In this case, the charge quantity supplied from the DC/DC converter 3 becomes equal to the charge quantity directly supplied from the battery group 1 to the load 4. Accordingly, the electric power Px owing to the DC/DC converter 3 has the following relationship to electric power consumption Po in the load 4.

$$Px/Po=E2/(E1+E2)$$

where Ei designates the voltage of a battery group i. Thus, Px becomes smaller than Po, and the capacity of the DC/DC converter 3 can be reduced correspondingly in comparison with that in the related art. In addition, the loss is reduced so that accessories such as a cooler can be miniaturized. As a result, the automobile battery power circuit itself can be reduced in cost and in size.

(Embodiment 2)

Figure 2:
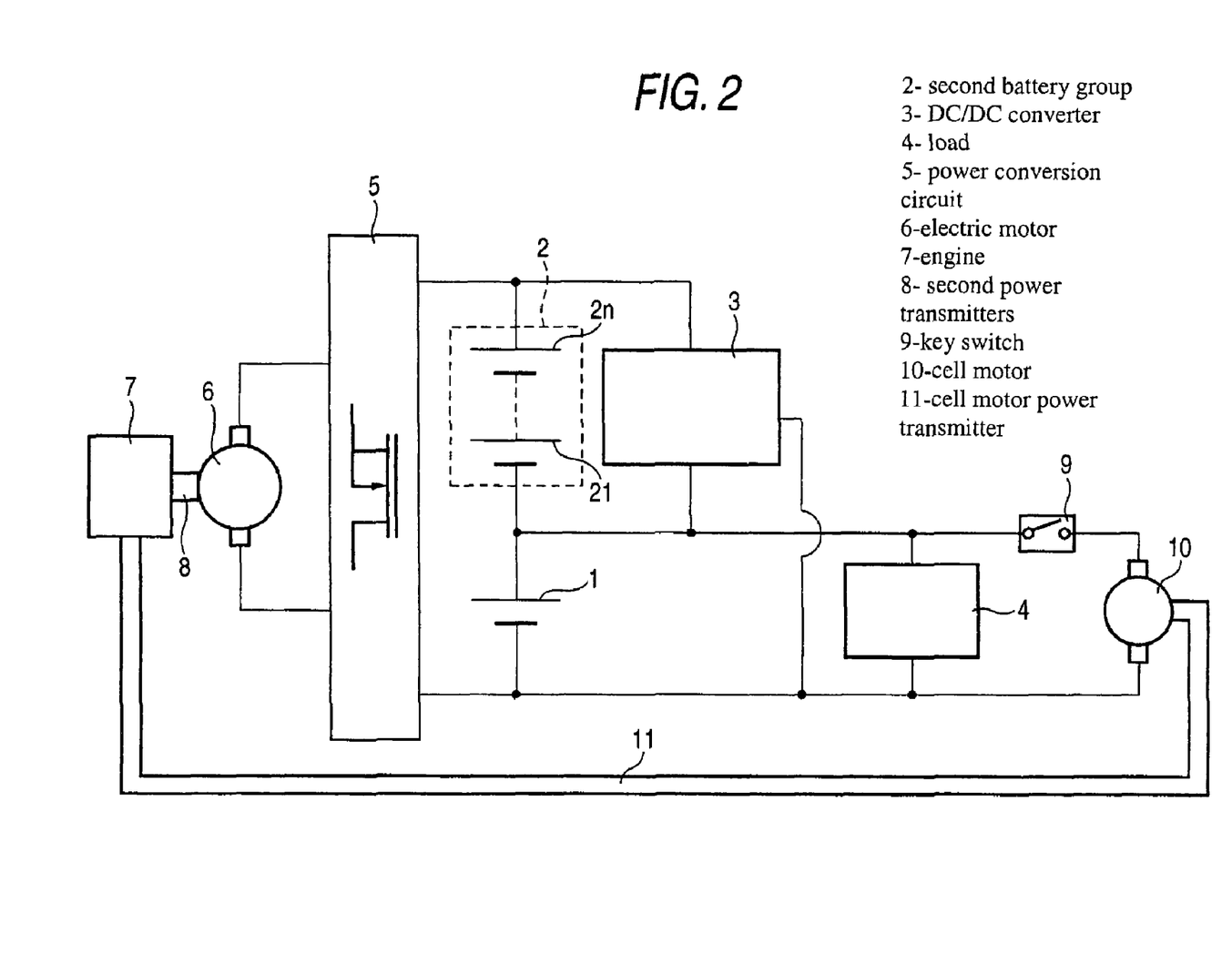
FIG. 2 is a diagram showing a battery power circuit according to Embodiment 2 of the invention.

FIG. 2 shows the configuration of an automobile battery power circuit according to Embodiment 2 of the invention. The automobile battery power circuit in FIG. 2 is different from that in FIG. 1 in that a cell motor 10 is connected to the battery group 1 through a key switch 9 for initial start-up. Only the initial start-up requiring high power is performed by the cell motor 10. As a result, electric power is supplied to the electric motor 6 through the power conversion circuit 5 so as to start the engine 7 only when the engine 7 is warmed up, so that the capacity of the power conversion circuit 5 can be reduced as described in the related art. A cell motor power transmitter 11 is used to start the engine 7 by means of the cell motor 10. In order to lead the engine 7 to a predetermined number of revolutions by means of the limited power of the cell motor 10, torque conversion may be performed using a belt, gears, or the like, in the cell motor power transmitter 11. In such a case, it is necessary to apply a current to the cell motor 10 for a long time in accordance with the time ratio corresponding to the conversion ratio. Therefore, the battery group 1 generally has to have a high capacity in spite of the low capacity of the load 4. Not to say, when the engine 7 is started by the power conversion circuit 5 and the electric motor 6 in the warm state of the engine 7, not only the power conversion circuit 5 but also the battery groups 1and 2 can be reduced in capacity. Accordingly, when it is intended to reduce the power circuit in size and in cost, it is desired that the battery group 2 is designed to have a low capacity while the battery group 1 is designed to have a high capacity. However, when batteries having different capacities are mixed, unbalance of voltage generally arises between the batteries so that a sufficient current may not be supplied to the cell motor 10 or a part of the batteries may be forced to generate an excessive voltage and destroyed. In FIG. 2, the charge of the battery group 2 is supplied to the battery group 1 through the DC/DC converter 3 so that the unbalance of voltage can be solved. Thus, it is not necessary to use a battery having excessive specifications as each of the batteries, so that the power circuit can be reduced in size and in cost.

(Embodiment 3)

Figure 3:
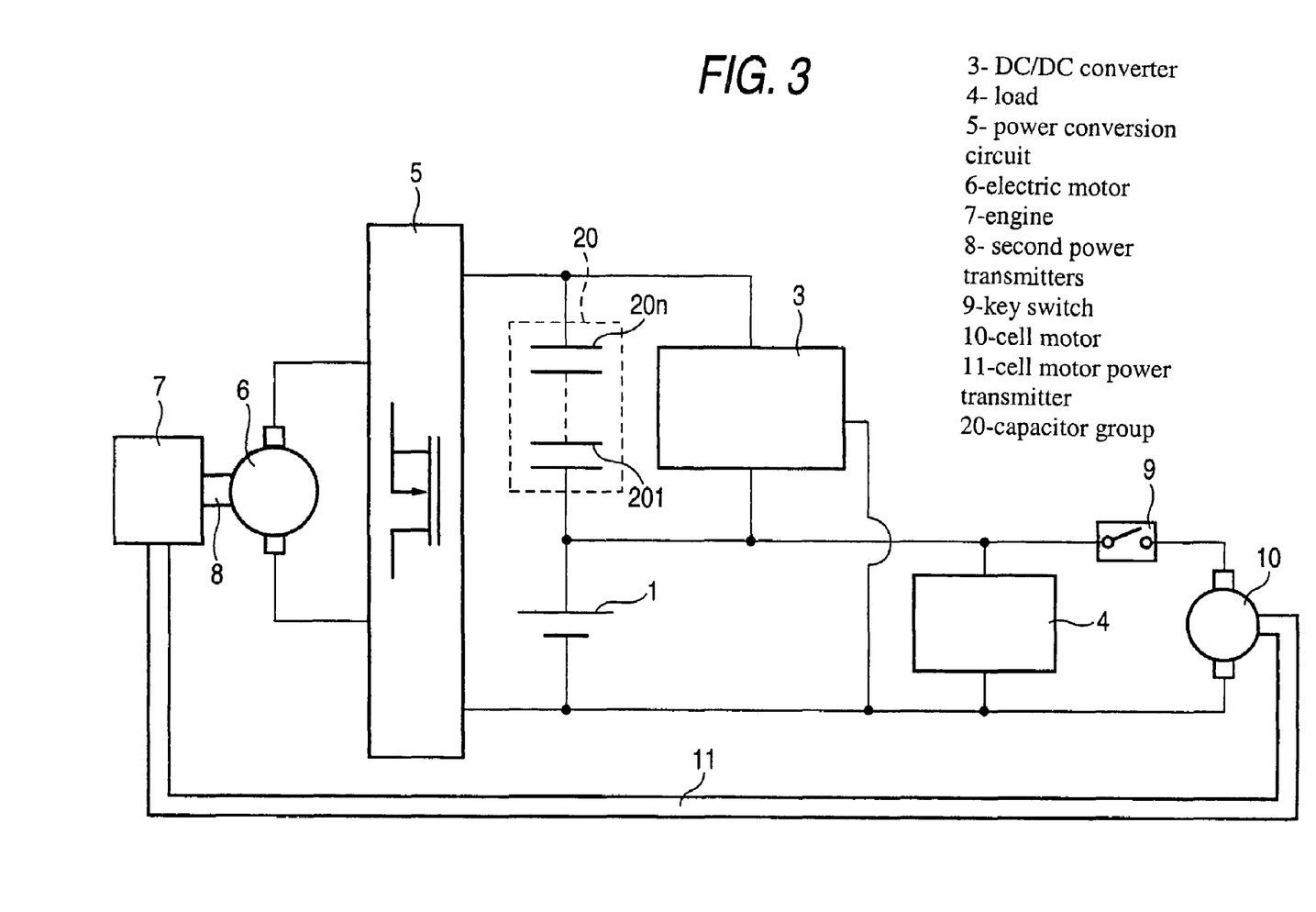
FIG. 3 is a diagram showing a battery power circuit according to Embodiment 3 of the invention.

FIG. 3 is a diagram showing the configuration of an automobile battery power circuit according to Embodiment 3 of the invention. The automobile battery power circuit in FIG. 3 is different from that in FIG. 2 in that the batteries of the battery group 2 are replaced by capacitors. That is, the battery group 2 is formed as a capacitor group 20 constituted by a series body of capacitors 201–20n. As described in Embodiment 2, the capacity of the battery group 2 may be low when the load 4 has a low capacity. Accordingly, not batteries but capacitors can satisfy the specifications sufficiently in some cases. Particularly, of capacitors, electric double layer super capacitors, electrolytic capacitors, or the like, can be used because they can secure high capacitance. Thus, the batteries 21–2n are removed so that the lives of parts can be expected to be longer on a large scale.

(Embodiment 4)

Figure 4:
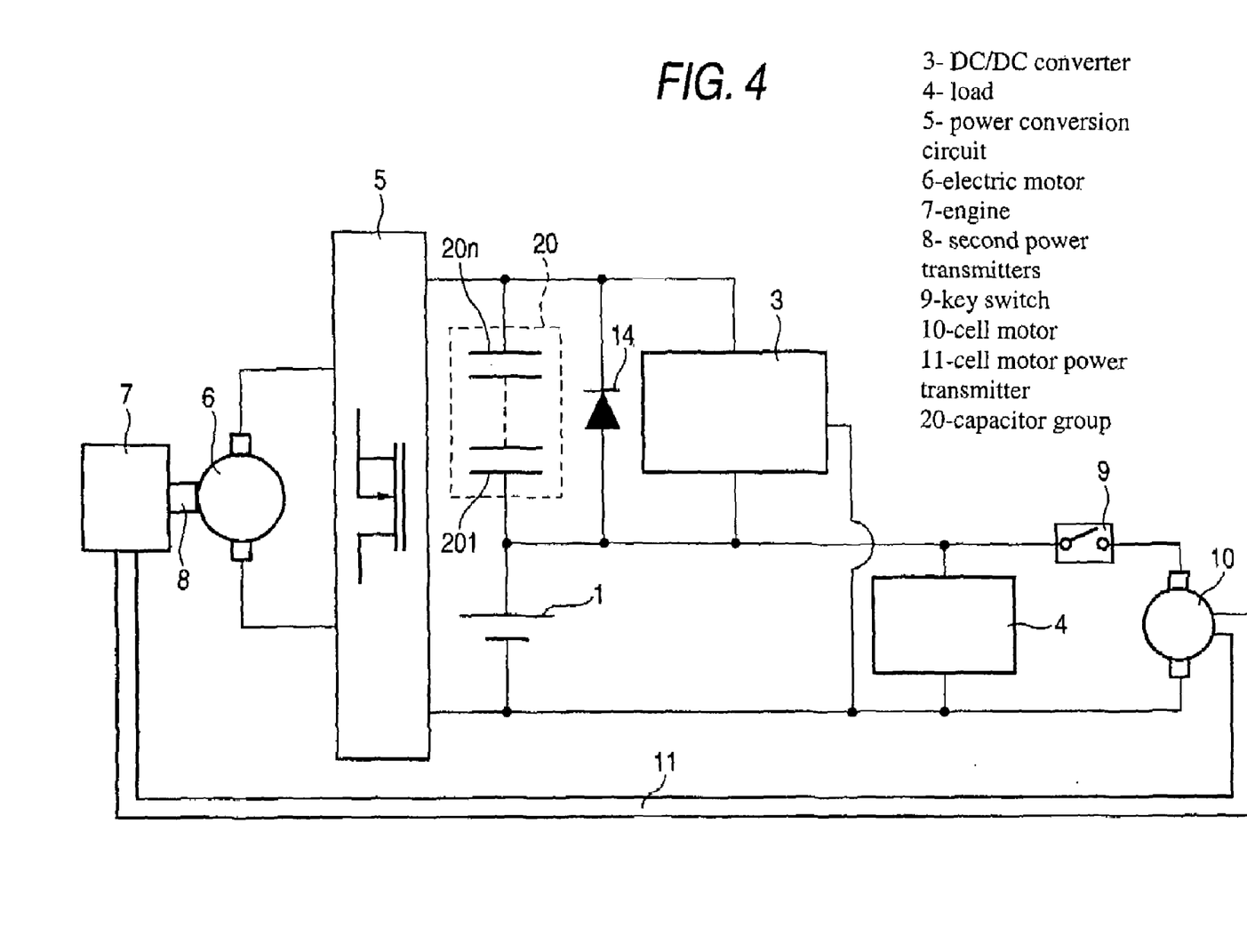
FIG. 4 is a diagram showing a battery power circuit according to Embodiment 4 of the invention.

FIG. 4 is a diagram showing the configuration of an automobile battery power circuit according to Embodiment 4 of the invention. The automobile battery power circuit in FIG. 4 is different from that in FIG. 3 in that a diode 14 is connected in parallel with the opposite ends of the capacitor group 20. If the capacitance of the capacitor group 20 is not high enough at the time when the electric motor 6 is rotated by the charge charged in the capacitor group 20, the voltage of the capacitor group 20 may be attenuated soon. Thus, there is a fear that the capacitor group 20 is reversely charged before the number of revolutions large enough to start the engine is obtained. With the diode 14 connected to the opposite ends of the capacitor group 20, the capacitor group 20 is prevented from being charged reversely. Thus, the voltage supplied to the power conversion circuit 5 stays substantially in the voltage of the high-capacity battery group 1. Only the initial start-up of the engine 7 when the engine 7 is warmed up is covered by the electric power from the capacitor group 20. When the engine 7 starts slightly so that the required power is reduced, the electric power from the high-capacity battery group 1 accelerates the rotation of the engine 7 continuously through the electric motor 6. Thus, the capacitance of the capacitor group 20 can be reduced further so that the power circuit can be reduced in size and in cost.

(Embodiment 5)

Figure 5A:
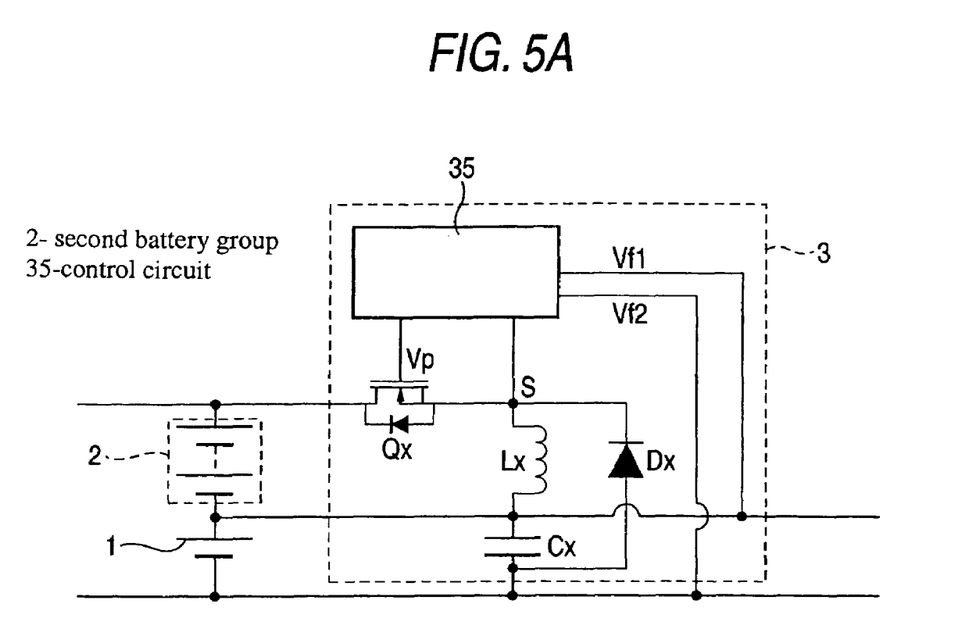
FIGS. 5A and 5B are diagrams showing a circuit of a DC/DC converter according to Embodiment 5 of the invention.
Figure 5B:
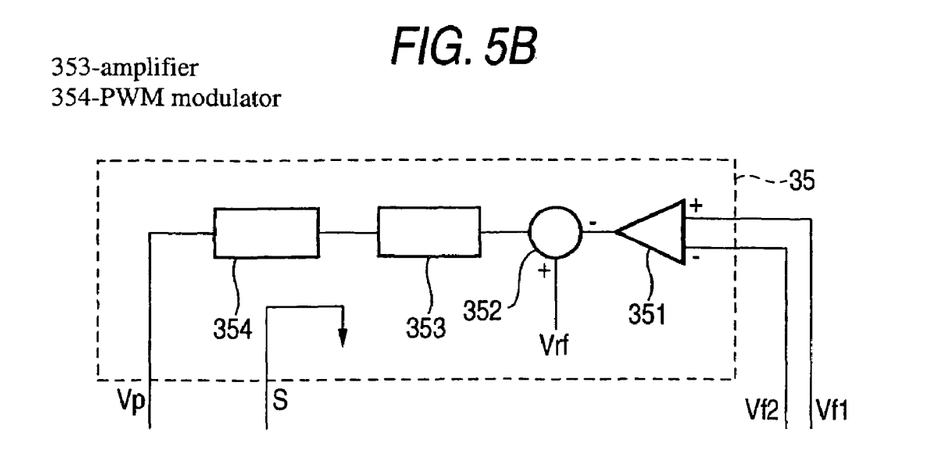

FIGS. 5A and 5B are diagrams showing an embodiment of the DC/DC converter 3 described in the previous embodiments of the invention. In FIG. 5A, the reference sign Qx represents a semiconductor such as a MOSFET; Lx, a reactor; DX, a diode; and Cx, a smoothing capacitor. The semiconductor Qx is controlled by a control circuit 35. In the control circuit 35, first, a voltage E1 of the battery group 1 is obtained by differential amplification of voltages Vf1 and Vf2 by a differential amplifier 351, and an error between the obtained voltage E1 and its desired value Vrf is obtained by an error amplifier 352. The obtained error is amplified by an amplifier 353, and PWM-modulated by a PWM modulator 354. Thus, a pulse Vp is obtained. The semiconductor Qx is turned on/off in accordance with the output of the pulse Vp so as to define a current to flow into the reactor Lx. When the semiconductor Qx is off, the current flowing into the reactor Lx is passed through the diode Dx and accumulated in the capacitor Cx. Since the capacitor Cx is connected to the battery group 1, after all, the electric power is transmitted from the battery group 2 to the battery group 1. The PWM modulator 354 operates to supply a more current from the battery group 2 to the battery group 1 when the error is large. Therefore, when the gain of the amplifier 353 is increased, the voltage E1 approaches the voltage Vrf practically. With such a configuration, a stable DC/DC converter can be constructed with a required minimum number of parts. Consequently, the cost of the DC/DC converter 3 can be reduced.

Incidentally, various systems can be considered about the configuration of the DC/DC converter. Fundamentally, any system will show similar effect if it can transmit the electric power of the battery group 2 to the battery group 1.

(Embodiment 6)

Figure 6:
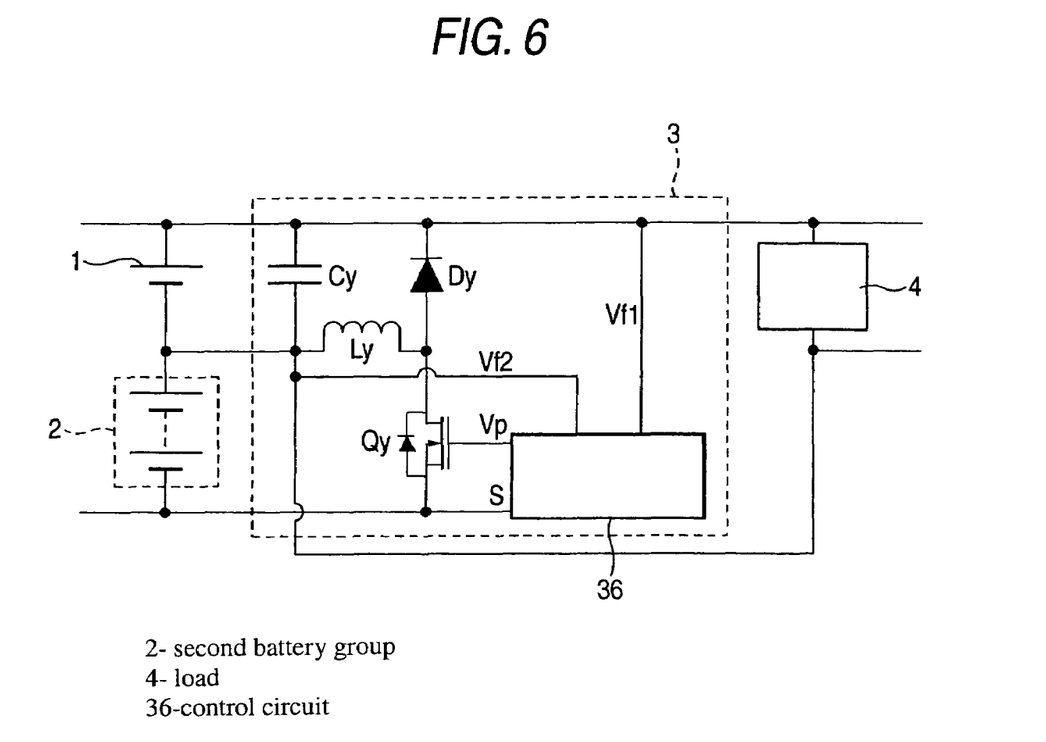
FIG. 6 is a diagram showing a battery power circuit according to Embodiment 6 of the invention.

FIG. 6 shows an automobile battery power circuit according to Embodiment 6 of the invention. The automobile battery power circuit in FIG. 6 is different from that in FIG. 1 particularly in that the battery group 1 is connected in series with the positive side of the battery group 2. The DC/DC converter 3 is connected between the battery group 1 and the battery group 2, and constituted by a semiconductor switch Qy, a reactor Ly, a diode Dy and a smoothing capacitor Cy. The configuration of a control circuit 36 and the operation of each constituent part of the DC/DC converter are the same as those in FIGS. 5A and 5B. That is, they can be described if Qx, Lx, Dx and Cx are replaced by Qy, Ly, Dy and Cy in the description of Embodiment 5.

(Embodiment 7)

Figure 7:
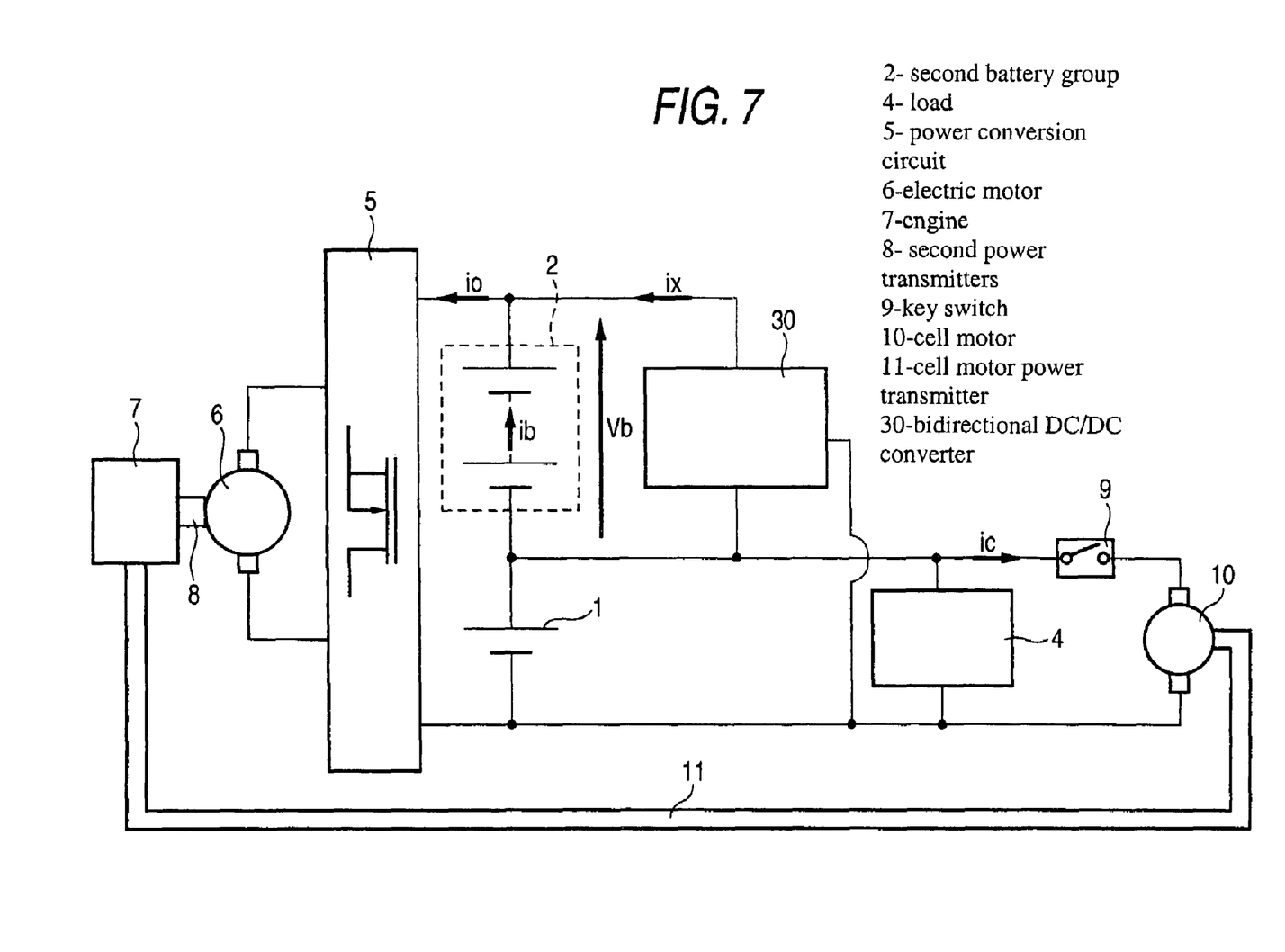
FIG. 7 is a diagram showing a battery power circuit according to Embodiment 7 of the invention.

FIG. 7 shows a configuration of an automobile battery power circuit according to Embodiment 7 of the invention. The automobile battery power circuit in FIG. 7 is different from that in FIG. 2 in that the DC/DC converter 3 is replaced by a bidirectional DC/DC converter 30. As described previously, when the power circuit has a cell motor 10 or when the load 4 has a high capacity, the battery group 1 has to have a high capacity, and on the contrary, a low capacity is sufficient for the battery group 2. In such a case, due to natural discharge, voltage attenuation occurs sooner in the low-capacity battery group 2 than in the battery group 1. When the voltage of the battery group 2 drops, and when the electric energy generated by the electric motor 6 is not sufficient (in case of temporary stop in a comparatively short time after the initial start-up), there is a possibility that the idle stop operation is not carried out normally. According to the invention, in order to solve this problem, there is provided a bidirectional DC/DC converter 30 which can also charge reversely from the high-capacity battery group 1 to the low-capacity battery group 2. When the voltage of the battery group 2 drops, and when the electric energy generated by the electric motor 6 is not sufficient, the battery group 2 is full-charged from the high-capacity battery group 1 by the bidirectional DC/DC converter 30 so that the subsequent idle stop operation can be carried out.

Figure 8:
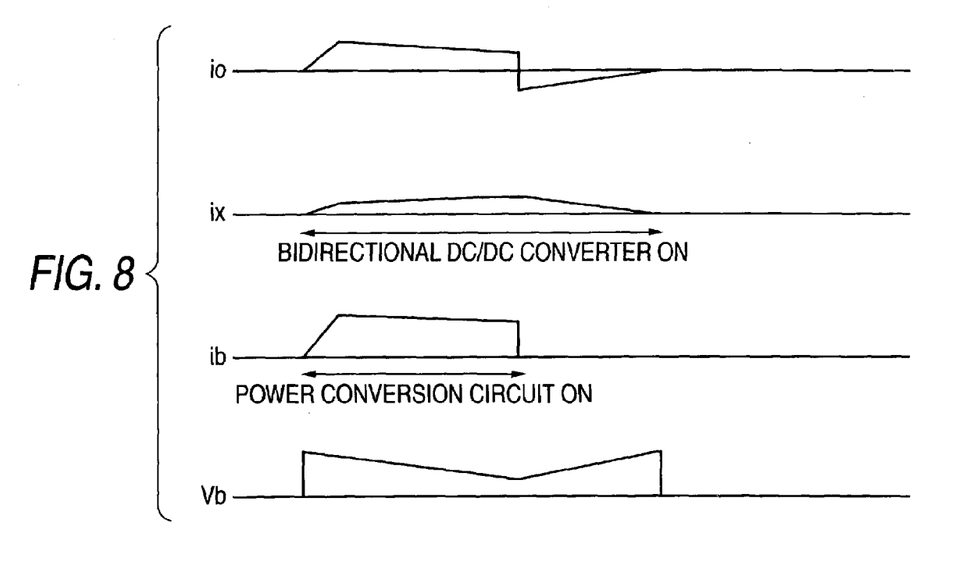
FIG. 8 is a diagram for explaining the operation at the time of restarting an engine according to Embodiment 7 of the invention.

FIG. 8 shows the operational relationship between the power conversion circuit 5 and the bidirectional DC/DC converter 30 when the engine is restarted. As soon as the operation of the power conversion circuit 5 starts, the bidirectional DC/DC converter 30 is actuated to transmit electric power from the battery group 1 to the battery group 2. Thus, the current flowing into the battery group 2 can be reduced so that the capacity of the battery group 2 can be reduced. When the power conversion circuit 5 is turned off, the battery group 2 is recharged to a predetermined voltage by the bidirectional DC/DC converter 30 so as to take care of the next restart.

Figure 9:
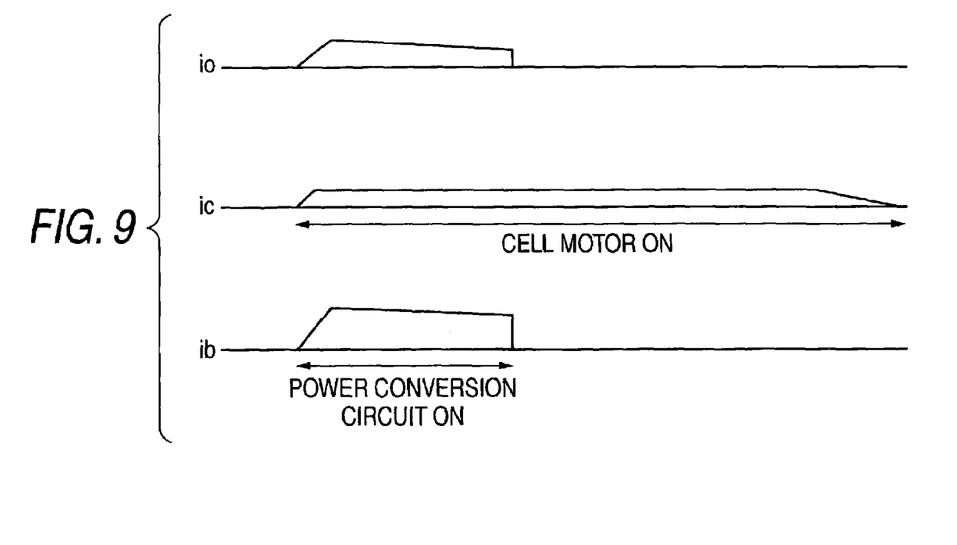
FIG. 9 is a diagram showing the operation when initial start-up is carried out by a cell motor according to Embodiment 7 of the invention.

FIG. 9 shows the operation when initial start-up is carried out by means of the cell motor 10. As soon as the cell motor 10 is turned on, the power conversion circuit 5 is turned on to transmit power to the engine 7 through the electric motor 6. Thus, the transmitted power from the cell motor 10 can be reduced. As a result, the capacity of the cell motor 10 and the capacity of the battery group 1 can be reduced so that the battery power circuit can be reduced in size and in cost.

Incidentally, the bidirectional DC/DC converter 30 does not operate during the operation of the cell motor 10 in FIG. 9. However, also in the initial start-up, as shown in FIG. 8, the bidirectional DC/DC converter 30 may be actuated simultaneously. In this manner, the power transmitted to the electric motor 6 increases so that the capacity of the cell motor 10 can be reduced.

Incidentally, FIG. 7 shows a diagram of a power circuit having the cell motor 10. However, in the case of a power circuit which does not include the cell motor 10 and carries out the initial start-up of the engine by means of the electric motor 6, the low-capacity battery group 2 is full-charged by the high-capacity battery group 1 before the initial start-up of the engine. Thus, even if the voltage of the battery group 2 is attenuated, the initial start-up of the engine 7 and the idle stop operation can be carried out surely.

Thus, according to Embodiment 7, the batteries of the power circuit can be reduced in capacity so that the circuit can be reduced in cost and in size. In addition, the current flowing into the battery group 2 becomes so small that there is no problem even if high-impedance batteries are used for the battery group 2.

Incidentally, though not shown in the drawings, the battery group 2 may be substituted by capacitors. Further, effect similar to that in Embodiment 4 can be obtained when a diode is connected in parallel with the opposite ends of the capacitors. Furthermore, when the battery group 2 is substituted by capacitors, the voltage of the capacitors can be set desirably within a range not higher than the withstand voltage of the capacitors or the power conversion circuit 5. Thus, by adjusting the capacitor voltage at the time of restart or initial start-up, a desired output can be extracted from this power circuit without increasing the output of the bidirectional DC/DC converter 30 so much. When the output of the bidirectional DC/DC converter 30 and the withstand voltage of the capacitors are selected, this power circuit can be designed to have an optimal and small size.

In addition, when the power conversion circuit according to the invention is used, and the cell motor 10 or the bidirectional DC/DC converter 30 is provided, the motorcar can start to move only if the battery group 1 is charged in advance. Accordingly, externally charging terminals may be provided in the battery group 1.

(Embodiment 8)

Figure 10:
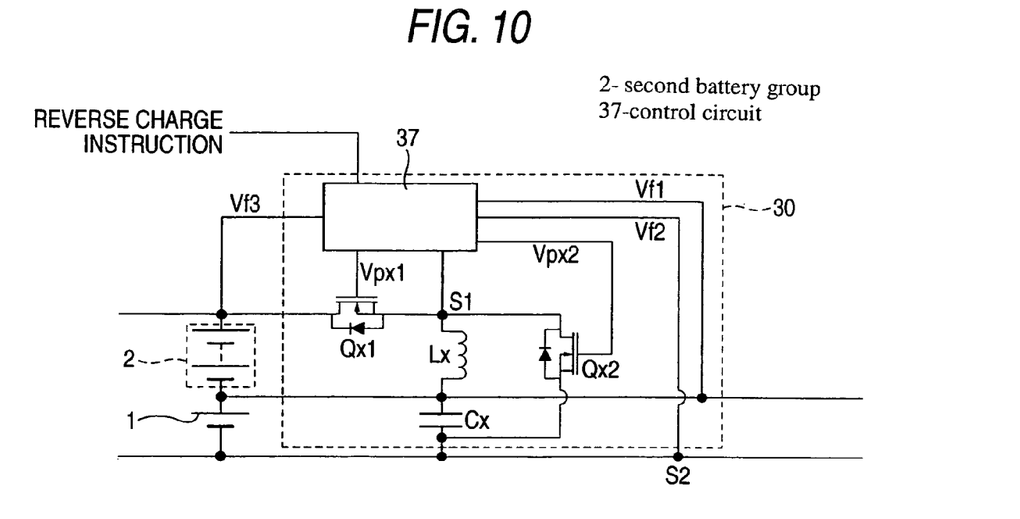
FIG. 10 is a diagram showing a battery power circuit according to Embodiment 8 of the invention.

FIG. 10 shows an embodiment of the bidirectional DC/DC converter 30. The bidirectional DC/DC converter 30 in FIG. 10 is different from the DC/DC converter 3 in FIGS. 5A and 5B in that the diode Dx is replaced by a semiconductor device Qx2 such as a MOSFET. When electric power is transmitted from the battery group 2 to the battery group 1, an antiparallel diode belonging to the semiconductor device Qx2 plays role of the diode Dx in FIG. 5A. On the other hand, when electric power is transmitted from the battery group 1 to the battery group 2, a current is applied from the battery group 1 to the reactor Lx by switching of the semiconductor device Qx2, and the battery group 2 is charged through the antiparallel diode of the semiconductor device Qx1 during the off period of the semiconductor device Qx1. Thus, a function of reverse charging to the battery group 2 is added by such a slight variation that the diode Dx is replaced by the semiconductor device Qx2 such as a MOSFET.

Figure 11:
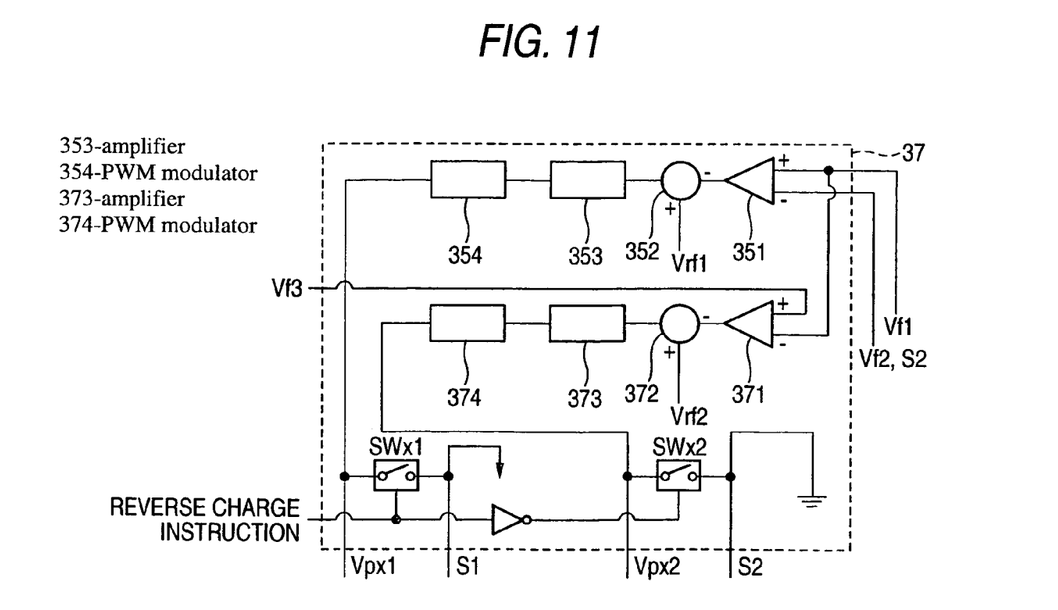
FIG. 11 is a diagram showing a control circuit in the battery power circuit according to Embodiment 8 of the invention.

FIG. 11 is a diagram showing the configuration of a control circuit 37. As shown in FIG. 11, a feedback circuit for controlling a voltage Vf3 between the opposite ends of the battery group 2 is newly added in the control circuit 37. The operations of a differential amplifier 371, an error amplifier 372, an amplifier 373 and a PWM modulator 374 are similar to those in FIGS. 5A and 5B, and description thereof will be omitted. Short-circuit switches SWx1 and SWx2 are provided in the outputs of PWM modulators 354 and 374 respectively so as to have a function as a control unit for making control to prevent the semiconductor devices Qx1 and Qx2 from being turned on simultaneously to thereby short-circuit the battery groups. That is, the short-circuit switches SWx1 and SWx2 are beforehand set to make on/off operations opposite to each other. Thus, the short-circuit of the battery groups can be prevented in any case. When a reverse charge instruction supplied from the outside of the control circuit 37 is 1, the short-circuit switch SWx1 is short-circuited so that the semiconductor device Qx1 is always off. On the contrary, when the instruction is 0, the short-circuit switch SWx2 is short-circuited so that the semiconductor device Qx2 is always off. In such a manner, the semiconductor devices Qx1 and Qx2 are prevented from being turned on simultaneously, so that the reliability of the battery power circuit is improved on a large scale.

(Embodiment 9)

Figure 12:
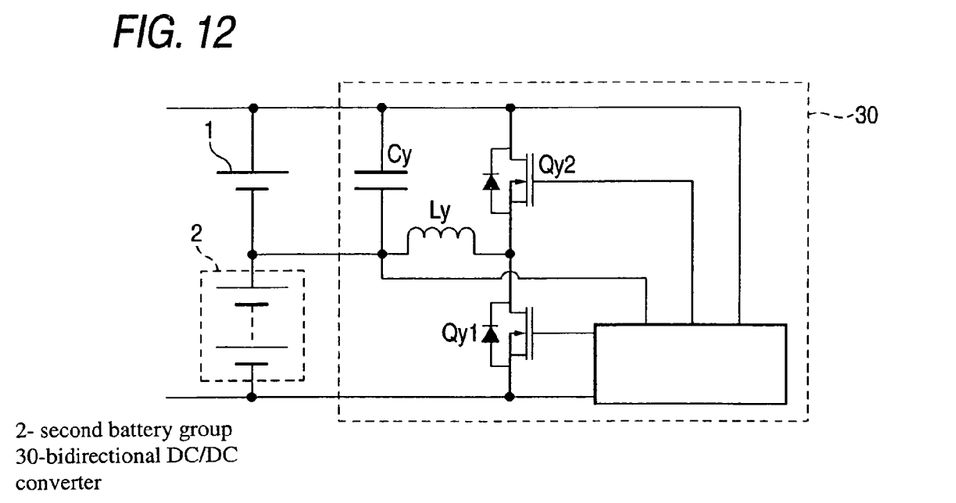
FIG. 12 is a diagram showing a battery power circuit according to Embodiment 9 of the invention.

FIG. 12 is a diagram showing an automobile battery power circuit according to Embodiment 9 of the invention. FIG. 12 shows an embodiment of a bidirectional DC/DC converter when the battery group 1 is connected in series with the positive side of the battery group 2. This configuration is in the event the same as that in FIG. 10, and the operation is also the same as that in FIG. 10.

(Embodiment 10)

Figure 13:
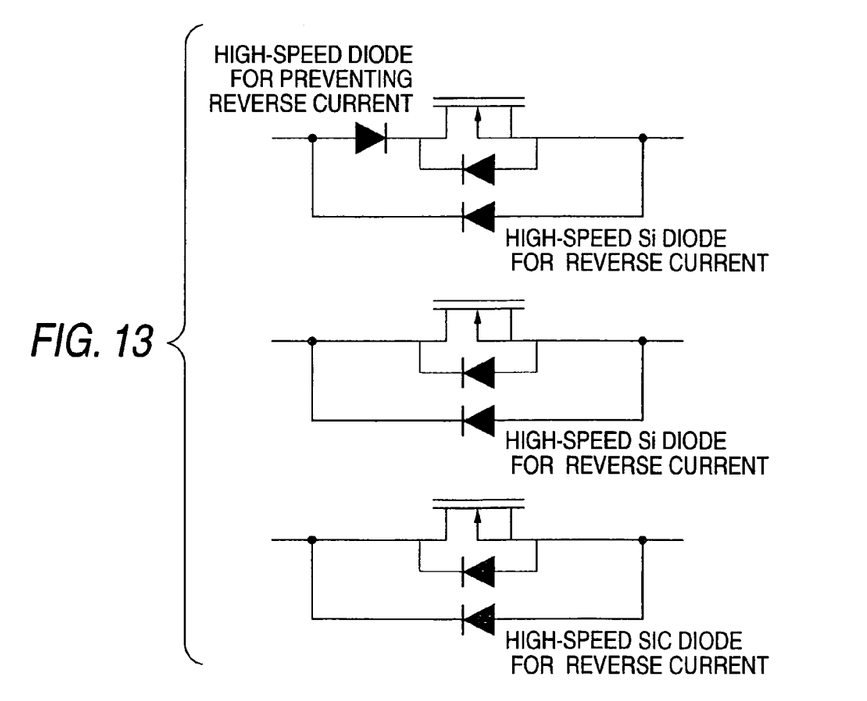
FIG. 13 is a diagram for explaining the configuration of a diode in a battery power circuit according to Embodiment 10 of the invention.

FIG. 13 is a diagram showing the configuration for speeding up the diode antiparallel-connected to the semiconductor device such as a MOSFET provided in the bidirectional DC/DC converter according to Embodiment 10 of the invention. By speeding up the diode, the loss in the diode portion can be generally lowered. Speeding up can be attained by connecting an SIC diode expected in the future to the semiconductor device such as a MOSFET.

(Embodiment 11)

Figure 14:
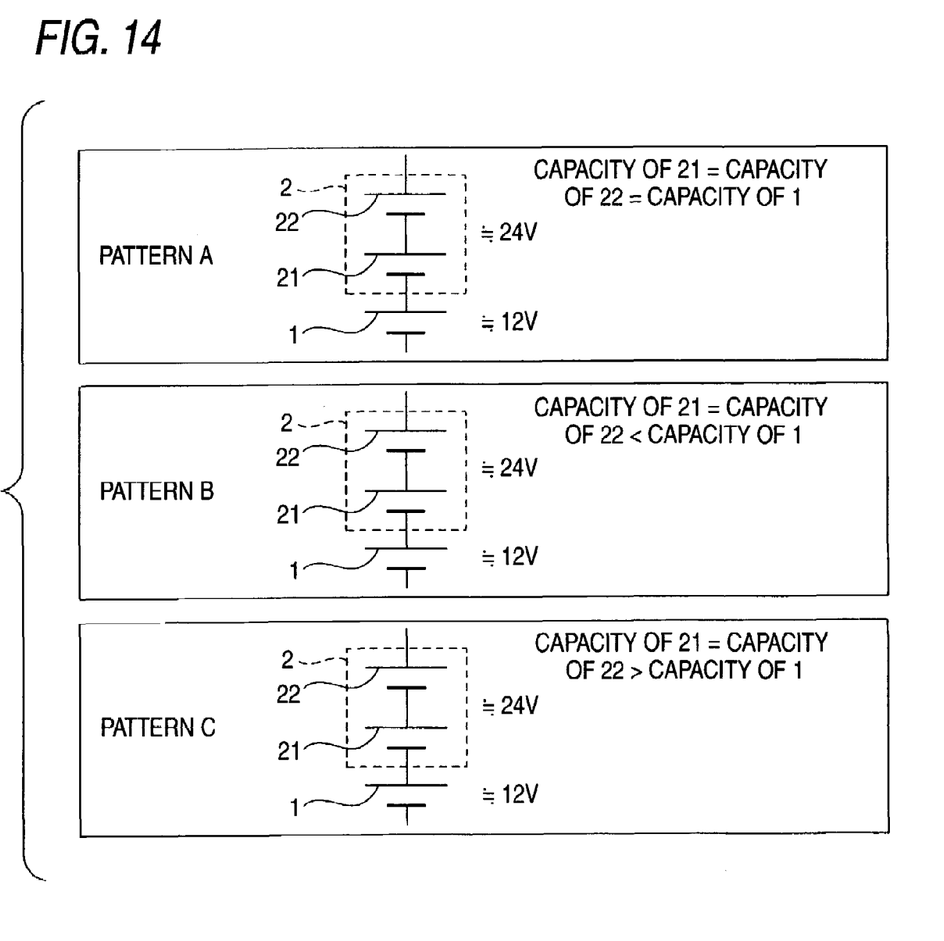
FIG. 14 is a diagram for explaining the configuration of batteries according to the invention.

FIG. 14 shows various forms of battery groups corresponding to all the embodiments. That is, FIG. 14 is a diagram showing the case where battery groups are constituted by three batteries with three patterns.

The pattern A shows the case where batteries having a rated voltage of 12 V are arranged in three-series.

The pattern B shows the case where batteries having a rated voltage of 12 V are arranged in three-series, and the battery group 1 has a higher capacity than any other. This pattern is effective in a power circuit in which the load 4 has a high capacity or the cell motor 10 for initial start-up is provided.

The pattern C shows the case where the battery group 1 has a lower capacity than any other. This pattern is effective in a system in which mounting with electric components of 42V systems is advanced, and the cell motor 10 is not provided. By reducing the capacity of the battery group 1 for electric components of 14V systems, the power circuit can be reduced in cost and in size.

In addition, not to say, the invention is applicable not only to an automobile battery system but also to a battery system having any purpose if it is an apparatus including batteries having two kinds of voltages, for example, to a microcomputer power supply system having outputs of 5 V and 12 V.

A battery power circuit according to the invention includes a first battery group connected to a load, a second battery group connected in series with the first battery group, and a DC/DC converter for electric power migration between the first battery group and the second battery group. Thus, the DC/DC converter can be designed to have a low capacity and a small size.

In addition, charging capacity of the first battery group is made different from charging capacity of the second battery group. Thus, further miniaturization can be attained.

In addition, the first battery group is constituted by one battery having a rated voltage of 12 V while the second battery group is constituted by two batteries having a rated voltage of 12 V and connected in series. Thus, a power circuit suitable to an automobile battery power circuit is provided In addition, the DC/DC converter includes a series body of a switch and a reactor connected between one end of a series body of the first battery group and the second battery group and a connection point where the first battery group and the second battery group are connected in series, and a diode connected between a connection point of the switch and the reactor and the other end of the series body of the battery groups. Thus, the DC/DC converter has a simple configuration with a reduced number of parts, so that further miniaturization can be attained.

In addition, the DC/DC converter is made a bidirectional DC/DC converter for bidirectional electric power migration between the first battery group and the second battery group. Thus, the DC/DC converter has a low capacity and a small size. In addition, even if a part of the battery groups discharges for some reason, the part of the battery groups can be charged by the other high-capacity battery groups. Thus, the reliability is improved.

Further, the bidirectional DC/DC converter includes a series body of a first switch and a second switch connected to opposite ends of a series body of the first battery group and the second battery group, and a reactor connected between a connection point of the first battery group and the second battery group and a connection point of the first switch and the second switch. Thus, the DC/DC converter is miniaturized.

In addition, a control unit is provided for making control to prevent the first switch and the second switch from being turned on simultaneously. Thus, the reliability is improved.

In addition, the second battery group is constituted by capacitors. Thus, miniaturization can be attained.

In addition, an automobile battery power circuit according to the invention includes anyone of the aforementioned battery power circuits, an electric motor whose power is transmitted to an engine, and a power conversion circuit connected between a series body of a first battery group and a second battery group and the electric motor. The electric motor generates electricity in response to the power from the engine and charges the series body of the battery groups through the power conversion circuit. Thus, the battery groups can be reduced in capacity.

Further, the electric motor is made an electric motor for restarting the engine which is stopped in accordance with temporary stop during driving. Thus, the battery groups can be further reduced in capacity.

In addition, a cell motor for starting the engine only by a key operation at an early stage of start of driving is connected as the load. Thus, the battery groups can be reduced in capacity.

In addition, electric power is supplied from the first battery group to the second battery group through the bidirectional DC/DC converter while the engine is restarted by the electric motor. Thus, the battery groups can be further reduced in capacity.

In addition, electric power is supplied from the series body of the first battery group and the second battery group to the electric motor through the power conversion circuit while the engine is started by the cell motor. Thus, the battery groups can be further reduced in capacity.

What is claimed is:

1. An automobile battery power circuit comprising:
   a battery power circuit;
   an electric motor whose power is transmitted to an engine; and
   a power conversion circuit connected between a series body of said first battery group and said second battery group and said electric motor, wherein
   said electric motor generates electricity in response to said power from said engine and charges said series body of said battery groups through said power conversion circuit,
   wherein, said battery power circuit comprises:
   a first battery group connected to a load;
   a second battery group connected in series with said first battery group; and
   a bidirectional DC/DC converter for electric power migration between said first battery group and said second battery group.

2. The automobile battery power circuit according to claim 1, wherein
   said electric motor restarts said engine which is stopped in accordance with temporary stop during driving.

3. The automobile battery power circuit according to claim 2, wherein
   a cell motor for starting said engine only by a key operation at an early stage of start of driving is connected as a load.

4. The automobile battery power circuit according to claim 2, wherein
   electric power is supplied from said first battery group to said second battery group through said bidirectional DC/DC converter while said engine is restarted by said electric motor.

5. The automobile battery power circuit according to claim 3, wherein
   electric power is supplied from said series body of said first battery group and said second battery group to said electric motor through said power conversion circuit while said engine is started by said cell motor.

6. The automobile battery power circuit according to claim 1, wherein said power conversion circuit is connected to opposite ends of the series of said first battery group and said second battery group.

7. The automobile battery power circuit according to claim 1, wherein said second battery group is constituted by capacitors.

8. The automobile battery power circuit according to claim 1, wherein said cell motor starts said engine via a key switch.

* * * * *